(12) United States Patent  
Taguchi et al.

(10) Patent No.: US 7,084,603 B2  
(45) Date of Patent: Aug. 1, 2006

(54) MOTOR CONTROL DEVICE

(75) Inventors: Hitoshi Taguchi, Tokyo (JP); Takeshi Kitahata, Mei-ken (JP); Yosuke Nakazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/844,580

(22) Filed: May 13, 2004

(65) Prior Publication Data

US 2004/0257030 A1     Dec. 23, 2004

(30) Foreign Application Priority Data

May 13, 2003   (JP)   .............................. 2003-134578

(51) Int. Cl.  
H02P 23/00 (2006.01)  
H02P 25/00 (2006.01)  
H02P 27/00 (2006.01)  
H02P 27/04 (2006.01)

(52) U.S. Cl. ...................... 318/808; 318/139; 318/432; 318/434; 318/606; 318/607; 318/608; 318/609; 318/610; 318/727; 318/807; 318/811

(58) Field of Classification Search ................ 318/432, 318/434, 606, 607, 608, 609, 610, 727, 811, 318/808  
See application file for complete search history.

(56) References Cited

U.S. PATENT DOCUMENTS 5,811,749 A * 9/1998 Bausch et al. .............. 218/157
6,005,365 A * 12/1999 Kaneko et al. ............. 318/700
6,107,776 A * 8/2000 Nakazawa .................. 318/811
6,580,247 B1   6/2003 Nakazawa
6,583,593 B1 * 6/2003 Iijima et al. ................ 318/254
6,583,693 B1 * 6/2003 Paynter et al. .............. 333/254
6,788,024 B1 * 9/2004 Kaneko et al. ............. 318/807
2001/0002784 A1 * 6/2001 Masaki et al. .............. 318/727
2002/0008492 A1 * 1/2002 Nagayama .................. 318/727
2002/0041171 A1 * 4/2002 Cho ........................... 318/727
2002/0060548 A1 * 5/2002 Iwaji et al. .................. 318/727
2002/0163319 A1 * 11/2002 Kaneko et al. ............. 318/727
2003/0020429 A1 * 1/2003 Masaki et al. .............. 318/727
2005/0073280 A1 * 4/2005 Yoshinaga et al. ......... 318/727

FOREIGN PATENT DOCUMENTS

| JP | 3154965 B2 | 2/2001 |
| JP | 3312472 B2 | 5/2002 |
| JP | 2002-281782 A | 9/2002 |

* cited by examiner

*Primary Examiner*—Rina Duda  
*Assistant Examiner*—Erick Glass  
(74) *Attorney, Agent, or Firm*—Foley & Lardner LLP

(57) ABSTRACT

A motor control device that can reduce electrical noise is provided. A motor control device includes an inverter, a current controller, a high frequency wave superpositioner, and a high frequency wave setter. An inverter applies a current to the motor. A current controller outputs a voltage to the inverter according to a current applied to the motor from the inverter. A high frequency wave superpositioner applies a high frequency wave to the voltage from the current controller as a superpositioned wave to infer a position of a rotor in the motor. A high frequency wave setter varies at least one characteristic of the superpositioned wave applied by the high frequency wave superpositioner.

31 Claims, 11 Drawing Sheets

MOTOR CONTROL DEVICE

CROSS REFERENCE TO RELATED APPLICATION

This application is based upon and claims the benefit of priority from the prior Japanese Patent Application No. 2003-134578 filed on May 13, 2003, the entire contents of which are incorporated herein by reference.

FIELD OF THE INVENTION

This invention relates to a motor control device, and in particular, a motor control device which applies a high frequency current or voltage to infer a rotor position without using a rotor position sensor provided to the motor.

DESCRIPTION OF THE BACKGROUND

When driving a motor that has electrical saliency, such as a synchronous motor, to produce a required torque, it is necessary to detect or infer a rotor position and supply an appropriate current according to a position of a magnetic pole of the motor.

To infer a rotor position of a motor having electrical saliency, it is known to apply a current or voltage that has higher frequency than a power source which generates a torque in a rotor. With such an application, a high frequency wave is superposed (also referred to as "superpositioned") on a wave of the power source. Hereinafter, the power source wave, either current or voltage, is referred to as a "basic wave", and its frequency is referred to as a "basic frequency". In this conventional method, the rotor position can be inferred by analyzing the component of the high frequency wave that is applied to the basic wave. According to this conventional method of inferring the rotor position, a speed of a motor can be controlled precisely because a current having an appropriate phase is supplied to the motor. To obtain sufficient current or voltage to infer the rotor position, the high frequency wave applied to the basic wave must have at least a particular amplitude. Hereinafter, this conventional method of control is referred to as a "high frequency wave superposition sensorless control." In the high frequency wave superposition sensorless control, a method that applies a high frequency wave on either a d-axis or a q-axis, of a rotary coordinates system of dq axes for vector control, may be referred to as a "single superposition." A method that applies a high frequency wave on both a d-axis and q-axis may be referred to as a "double superposition."

In this conventional method, the higher frequency wave tends to cause an electrical noise that is offensive to human ears.

SUMMARY OF THE INVENTION

Accordingly, an advantage of an aspect of the present invention is to provide a motor control device that reduces the electrical noise from a motor.

To achieve the above advantage, one aspect of the present invention is to provide a motor control device used for controlling a motor having a rotor that comprises an inverter that outputs a current for application to a motor, a current controller that outputs a voltage, representable as a wave, based on the current output by the inverter, a high frequency wave superpositioner that superpositions a high frequency wave on the voltage output from the current controller, the superpositioned high frequency wave used for inferring a position of a rotor in the motor, and a high frequency wave setter unit that provides the superpositioned high frequency wave to the high frequency wave superpositioner, the high frequency wave setter varies at least one characteristic of the superpositioned high frequency wave.

Another aspect of the present invention is to provide a motor control device used for controlling a motor having a rotor that comprises an inverter that outputs a current for application to a motor; a current controller that outputs a current, representable as a wave, based on the current output by the inverter, a high frequency wave superpositioner that superpositions a high frequency wave on the current output from the current controller, the superpositioned high frequency wave used for inferring a position of a rotor in the motor, and a high frequency wave setter unit that provides the superpositioned high frequency wave to the high frequency wave superpositioner, the high frequency wave setter varies at least one characteristic of the superpositioned high frequency wave.

Another aspect of the present invention is to provide a method of controlling a motor that comprises the steps of supplying a current to the motor, determining a control value based on the supplied current, supplying a high frequency wave, and superpositioning the high frequency wave on the control value to obtain a second control value, inferring a position of the rotor using the high frequency wave and the current supplied to the motor, and determining an updated current based on the second control value and the inferred position of the rotor, wherein the high frequency wave varies in at least one of its characteristics.

Further features, aspects and advantages of the present invention will become apparent from the detailed description of preferred embodiments that follows, when considered together with the accompanying figures.

DETAILED DESCRIPTION OF THE PREFERRED EMBODIMENTS

Figure 1:
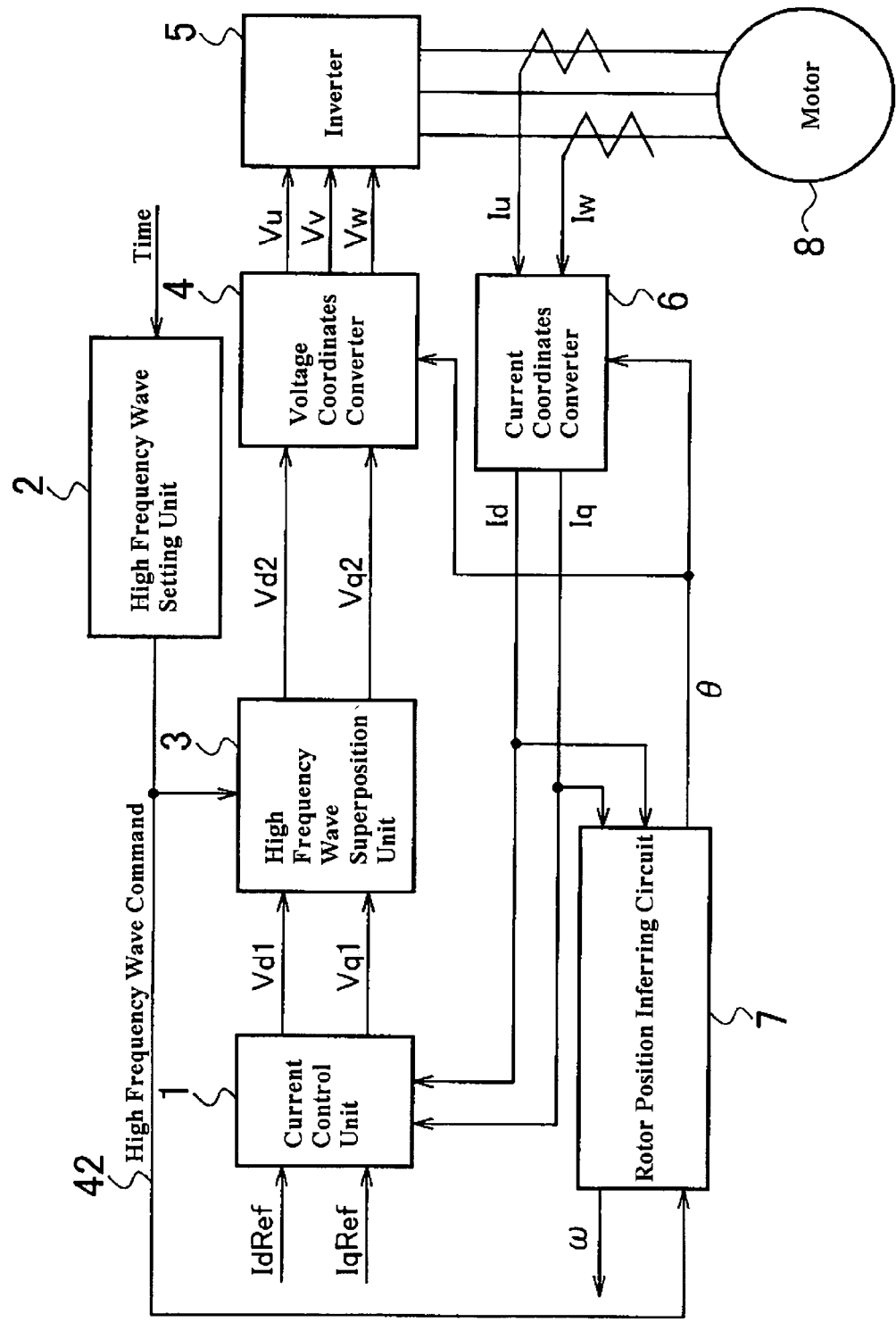
FIG. 1 is a schematic block diagram of a motor control device related to the first embodiment of the present invention.

FIG. 1 is a schematic block diagram of the first embodiment of the present invention.

As shown in FIG. 1, the control device includes a current control unit 1 (current controller), a high frequency wave setting unit 2 (high frequency wave setter), a high frequency wave superposition unit 3 (high frequency wave superpositioner), a voltage coordinates converter 4, an inverter 5, a current coordinates converter 6, and a rotor position inferring circuit 7. With this configuration, a motor 8 having a rotor is driven by power supplied from inverter 5. The following elements can be built using electric circuits or processor technology configured to carry out the noted functions and operations.

Current control unit 1 compares reference currents IdRef and IqRef, which are set points (desired values) for the dq-axes currents, with detected dq-axes currents Id and Iq that are detected from motor 8, and outputs a first voltage command Vd1 and Vq1 to change the detected currents Id and Iq, respectively, to correspond to reference currents IdRef and IqRef., in a feedback control manner. First voltage commands Vd1 and Vq1 are inputted into high frequency wave superposition unit 3, along with the signal from high frequency wave setting unit 2.

High frequency wave setting unit 2 outputs a high frequency wave command 42, which is superpositioned on first voltage commands Vd1 and Vq1 from current control unit 1, for purposes of inferring a position of the magnetic pole of the rotor in motor 8. High frequency wave setting unit 2 dynamically varies at least one characteristic, such as frequency or amplitude, of the high frequency wave command 42. The variation of the characteristic of the high frequency wave command may be in the time domain.

High frequency wave superposition unit 3 superpositions high frequency wave command 42 on first voltage commands Vd1 and Vq1. In other words, high frequency wave superposition unit 3 superposes a wave according to the high frequency wave command 42 on top of first voltage commands Vd1 and Vq1. In this manner, high frequency wave superposition unit 3 generates second voltage commands Vd2 and Vq2, which are also dq axis based voltages for vector control. Second voltage commands Vd2 and Vq2 are in turn input into the voltage coordinates converter 4.

Voltage coordinates converter 4 converts second voltage commands Vd2 and Vq2, which are dq-axes voltages, into three phase alternating voltage commands Vu, Vv, and Vw according to an inferred rotor position. The inferred rotor position, which means a position of a magnetic pole of the rotor, is an inferred phase θ obtained from rotor position inferring circuit 7. Three phase alternating voltage commands Vu, Vv, and Vw are input into inverter 5.

Inverter 5 applies a voltage to a motor 8 according to three phase alternating voltage commands Vu, Vv, and Vw. The voltage applied to a motor 8 is superpositioned (overlapped) with a high frequency superpositioned wave. Values of current Iu, which is the U-phase of the three phase alternating current applied to motor 8, and current Iw, which is the W-phase of the three phase alternating current applied to motor 8, are detected and input into current coordinates converter 6.

Current coordinates converter 6 converts currents Iu and Iw detected from motor 8 into detected dq-axis currents Id and Iq, on a dq-axis coordinate system, for vector control according to the inferred phase θ (inferred position of a magnetic pole of the rotor) from rotor position inferring circuit 7. Detected currents Id and Iq are input into current control unit 1 and rotor position inferring circuit 7.

Rotor position inferring circuit 7 infers a position of the magnetic pole, i.e., the inferred phase θ, and a speed of the rotor ω according to detected dq-axes currents Id and Iq from current coordinates converter 6 and high frequency wave command 42 from high frequency wave setting unit 2. This may be achieved by analyzing a component of frequency of the superpositioned wave included in the dq-axis currents Id and Iq, as understood by the person of ordinary skill in the art. Speed of the rotor ω obtained in rotor position inferring circuit 7 is input into speed controller (not shown).

According to an aspect of the present embodiment, high frequency wave setting unit 2 varies a characteristic value of high frequency wave command 42 generated therefrom according to a parameter such as time. This varied characteristic value may be at least one of frequency or amplitude, and the variation is of at least the frequency or amplitude of the superpositioned wave, which is superpositioned on a basic wave in order to infer a position of a magnetic pole of a rotor. By varying the characteristic of the superpositoned wave, it may avoid creating high intensity spikes or pulses in a wave that can generate undesired noise, and a spectrum of the high frequency wave may be dispersed.

The characteristic of the superpositioned wave, such as frequency or amplitude, may be varied in various ways, including continuously, discontinuously or discretely according to time, or any combination of the same.

Figure 2:
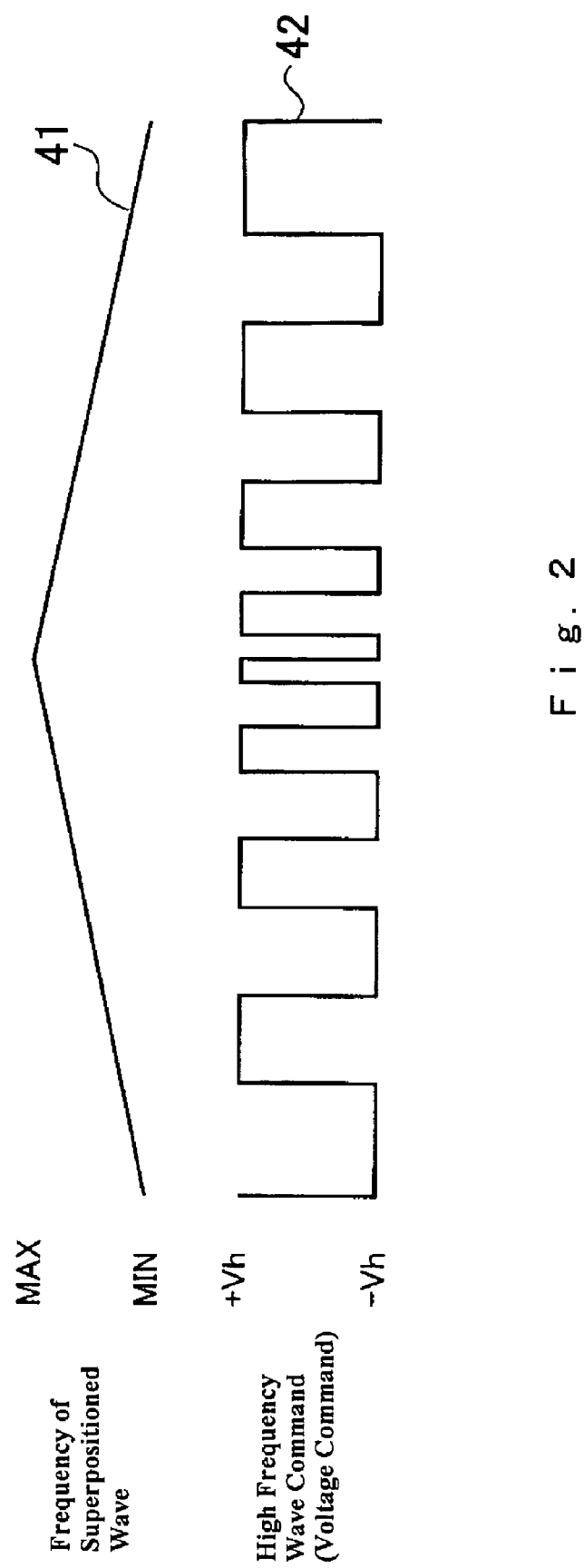
FIGS. 2 and 3 are periodic time charts showing a relationship between a frequency and a voltage command of a superpositioned wave according to the first embodiment.
Figure 3:
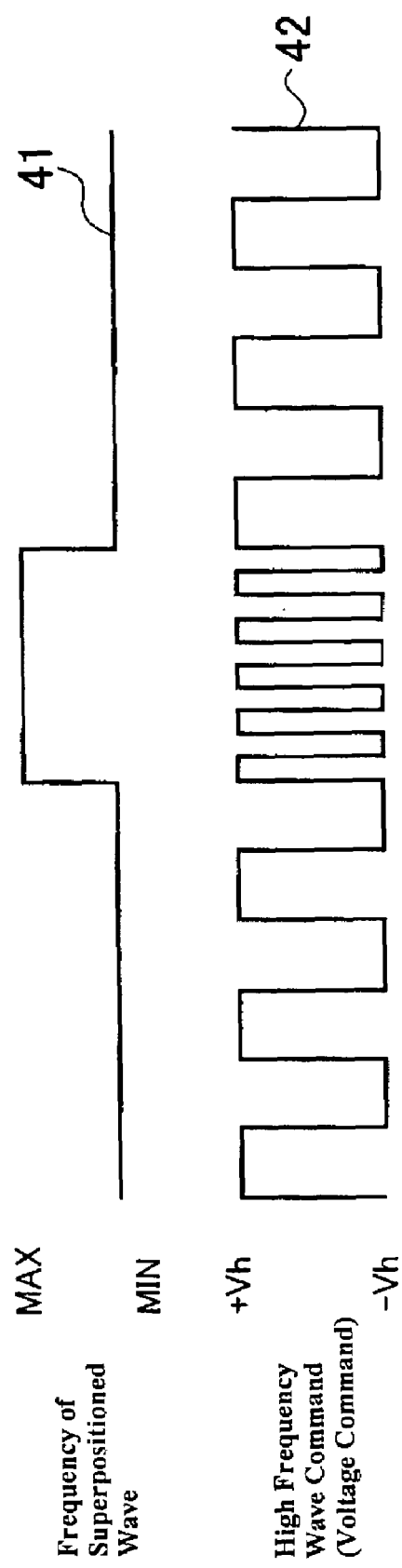

FIGS. 2 and 3 are examples of periodic time charts showing a relationship between a frequency and a voltage command of a superpositioned wave for the high frequency wave command.

In FIG. 2, a frequency 41 of the superpositioned wave is varied periodically and continuously according to time. In this case, a shape of high frequency wave command 42, which is the voltage command of the superpositioned wave that is applied to the high frequency wave superposition unit 3 and the rotor position inferring circuit 7, is a rectangular wave and periodically changes its frequency according to shape 41. A cycle for periodically varying frequency 41 of the superpositioned wave may be, preferably, more than ten (10) times the period individual or cycle of a basic wave.

In FIG. 3, a frequency 41 of the superpositioned wave is varied periodically, and discretely (not continuously). In this example, frequency 41 of the superpositioned wave is increased for some time period of the cycle. The resulting shape of the high frequency wave command 42, which also has a rectangular shape, has a changed frequency for this time period of the cycle.

Figure 4:
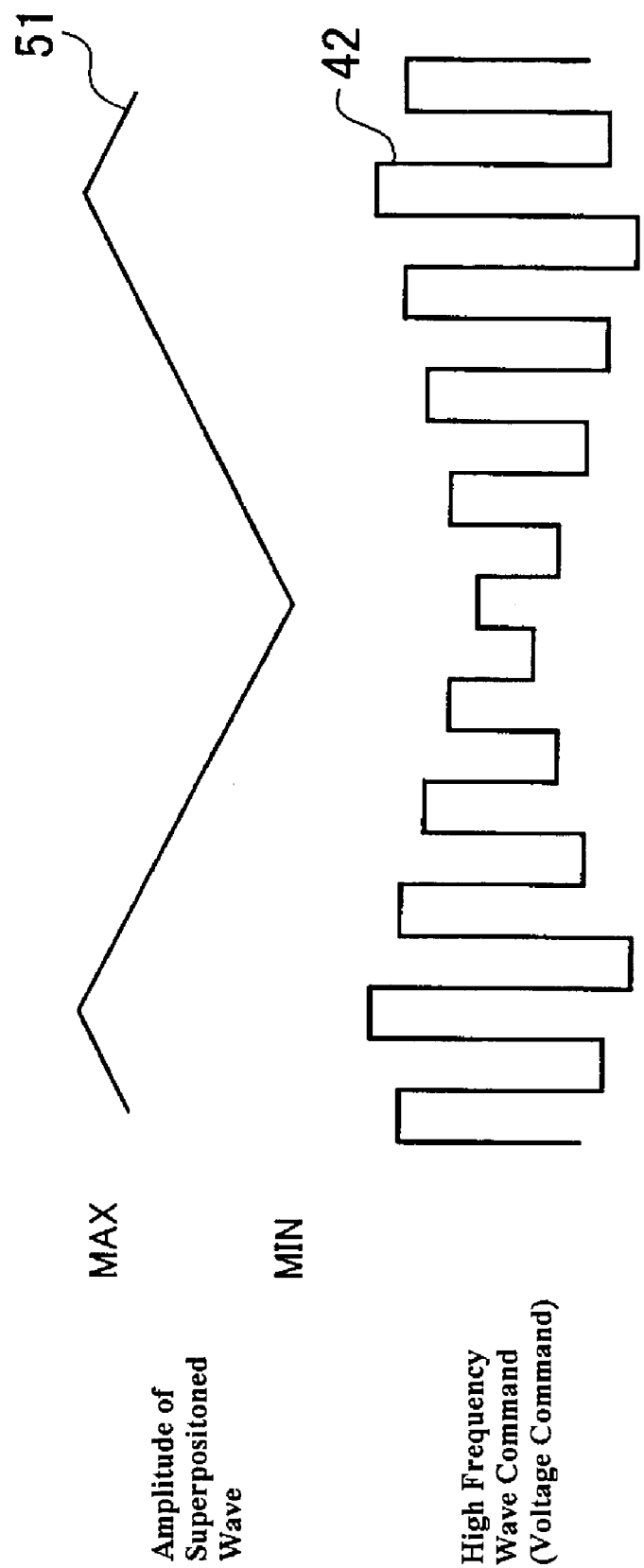
FIGS. 4 and 5 are periodic time charts showing a relationship between an amplitude and a voltage command of a superpositioned wave according to the first embodiment.
Figure 5:
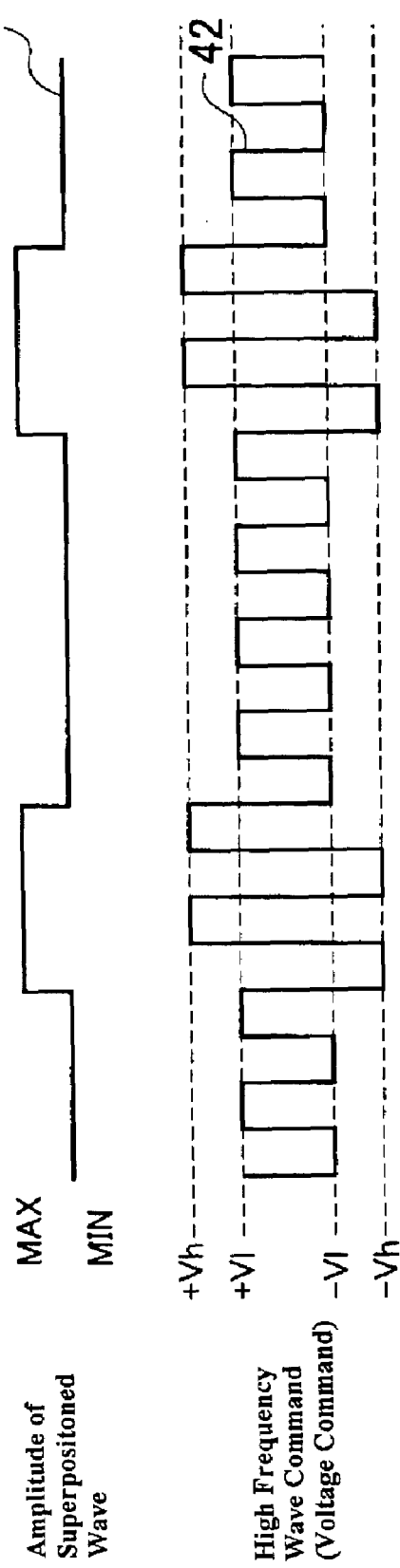

FIGS. 4 and 5 are examples of periodic time charts showing a relationship between an amplitude and a voltage command of a superpositioned wave for the high frequency wave command.

In FIG. 4, an amplitude 51 of the superpositioned wave is varied periodically and continuously according to time. In this case, the resulting shape of the high frequency wave command 42 (voltage command) has a rectangular shape that periodically changes in its amplitude according to the shape 51.

In FIG. 5, an amplitude 51 of the superpositioned wave is varied periodically, and discretely, according to time. In this example, amplitude 51 of the superpositioned wave is varied for some part of a cycle. The resulting shape of high frequency wave command 42 (voltage command), which also has a rectangular shape, changes in amplitude in this part of the cycle.

For the superpositioned wave that is used to infer a position of the rotor, the particular shape of the superpositioned wave may be determined preferably, such as a rectangular (pulse) wave, a sine wave, or a triangular wave, etc.

The characteristic of the superpositioned wave may be varied periodically or at random. The basis or parameter upon which the characteristic of the superpositioned wave is varied may be time or any other preferable parameter(s), for example, a noise level of surroundings or a distribution of frequency of the surrounding noise.

When varying the frequency in high frequency wave setting unit 2, a periodic (e.g., repeating) cycle in which the frequency is varied according to method above may preferably be set to be more than ten (10) times as long as a period or cycle of the superpositioned wave. In other words, the variation is repeated every 10 or more periods or cycles of the superpositioned wave.

Because it is not required to retain an amplitude of the superpositioned wave in some level indefinitely to infer the position of the rotor, when varying the amplitude in high frequency wave setting unit 2, it may vary amplitude of the superpositioned wave lower than the level for some part or time period of a cycle, to reduce an average level of the amplitude.

FIGS. 6A to 6D are examples of periodic time charts showing the voltage command of a superpositioned wave for the high frequency wave command.

In each of FIGS. 6A to 6D, +Vt and −Vt refer to voltage levels large enough voltage to infer the rotor position in rotor position inferring circuit 7. In other words, as long as the superpositioned wave has a voltage more than the voltage level, which means that an amplitude of the superpositioned wave is greater than 2Vt, then the rotor position inferring circuit 7 can infer a position of a magnetic pole of a rotor.

Figure 6A:
FIGS. 6A to 6D are periodic time charts showing voltage commands of a superpositioned wave according to the first embodiment.
Figure 6B:
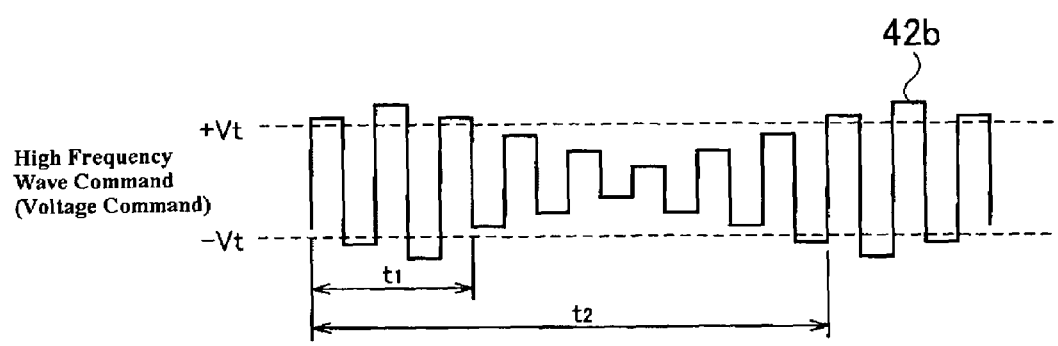
Figure 6C:
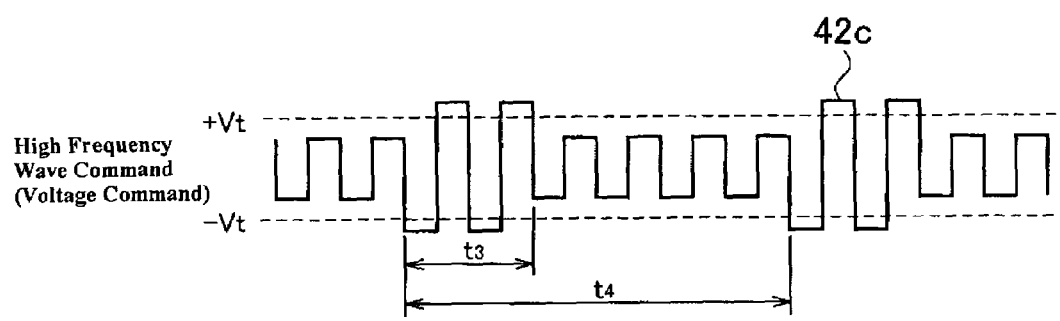
Figure 6D:
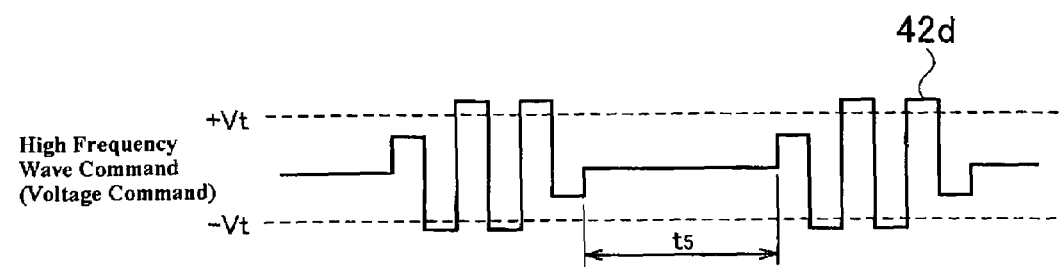

FIG. 6A shows a conventional superpositioned wave that has a constant frequency and amplitude (alternating between +Vt and −Vt) throughout its cycle. FIGS. 6B to 6D are examples in which the amplitude of the superpositioned wave is varied in a cycle.

In FIG. 6B, the amplitude of the superpositioned wave is greater than 2Vt during a time period t1 out of a cycle having a length t2. Moreover, in this example, the amplitude of superpositioned wave is continuously varied, including being smaller than 2Vt at various points in the cycle t2.

In FIG. 6C, the amplitude of the superpositioned wave is greater than 2Vt during a time period t3 out of a cycle having a length t4. Moreover, in this example, the amplitude of superpositioned wave is set to constant value when it changes to a relatively smaller amplitude (e.g., smaller than 2Vt).

In FIG. 6D, the amplitude of the superpositioned wave is greater than 2Vt during some time of a period of a cycle, just as with FIGS. 6B and 6C, but the amplitude of the superpositioned wave is set to zero in a time period t5. This means that, during the time period t5, there is no high frequency superpositioned wave that is overlapped onto the basic wave.

These examples, as shown in FIGS. 6B to 6D, can infer a position of a magnetic pole of a rotor, while reducing the amount of noise from the motor, by varying the amplitude of the superpositioned wave. The time period that the amplitude of the superpositioned wave is greater than 2Vt, such as time period t1 shown in FIG. 6B or time period t3 shown in FIG. 6C, may be predetermined preferably so that the rotor position inferring circuit 7 can infer a position of a magnetic pole of a rotor.

Figure 7:
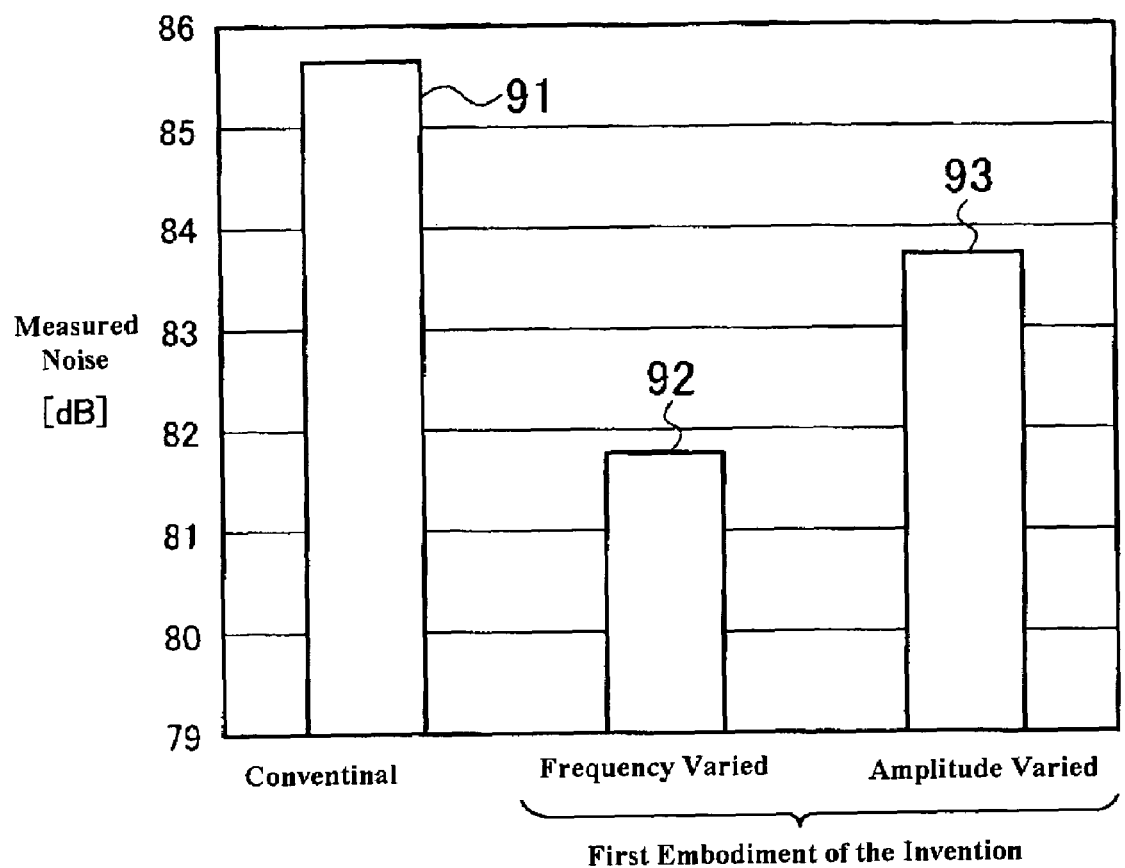
FIG. 7 is a chart comparing noise produced in a motor using a conventional control device with the noise produced in the motor utilizing the motor control device of the first embodiment.

FIG. 7 is a comparison chart showing a experimental data of noise produced in a motor using a conventional control device with the noise produced in the motor utilizing the motor control device of the first embodiment.

In this experiment, the noise is measured in a permanent magnet motor. Noise 91 shown as "Conventional" in FIG. 7 is measured when the frequency and amplitude of the superpositioned wave (for the high frequency wave command) is set to be constant (such as FIG. 6A). Noise 92 shown as a "Frequency Varied" results from using the control device according to the first embodiment, in which frequency of the superpositioned wave is varied continuously from 1 kHz to 1.25 kHz (a width of 0.25 kHz). Noise 93 shown as an "Amplitude Varied" results from using the control device according to the first embodiment, in which the amplitude of the superpositioned wave is set to be same as the "Conventional" once in every four waves (four wave periods or cycles), and sets one-third of the "Conventional" amplitude for the remaining three intervening wave periods. As shown in FIG. 7, the noise 92 or 93 are markedly less than the noise 91 associated with the "Conventional" approach.

While the high frequency wave superposition unit 3 overlaps the superpositioned wave on voltage commands Vd1 and Vq1 in the first embodiment, alternatively, a current command may be superpositioned by the superpositioned wave. In this case, current control unit 1 outputs first current commands. The high frequency wave superposition unit 3 overlaps the superpositioned wave on the first current commands. In this case, instead of the voltage coordinates converter 4, a current coordinates converter is used to convert the currents, of dq-axes coordinates, into a three phase alternating current.

These configurations are also able to reduce a level of noise in an analogous manner as described above.

Figure 8:
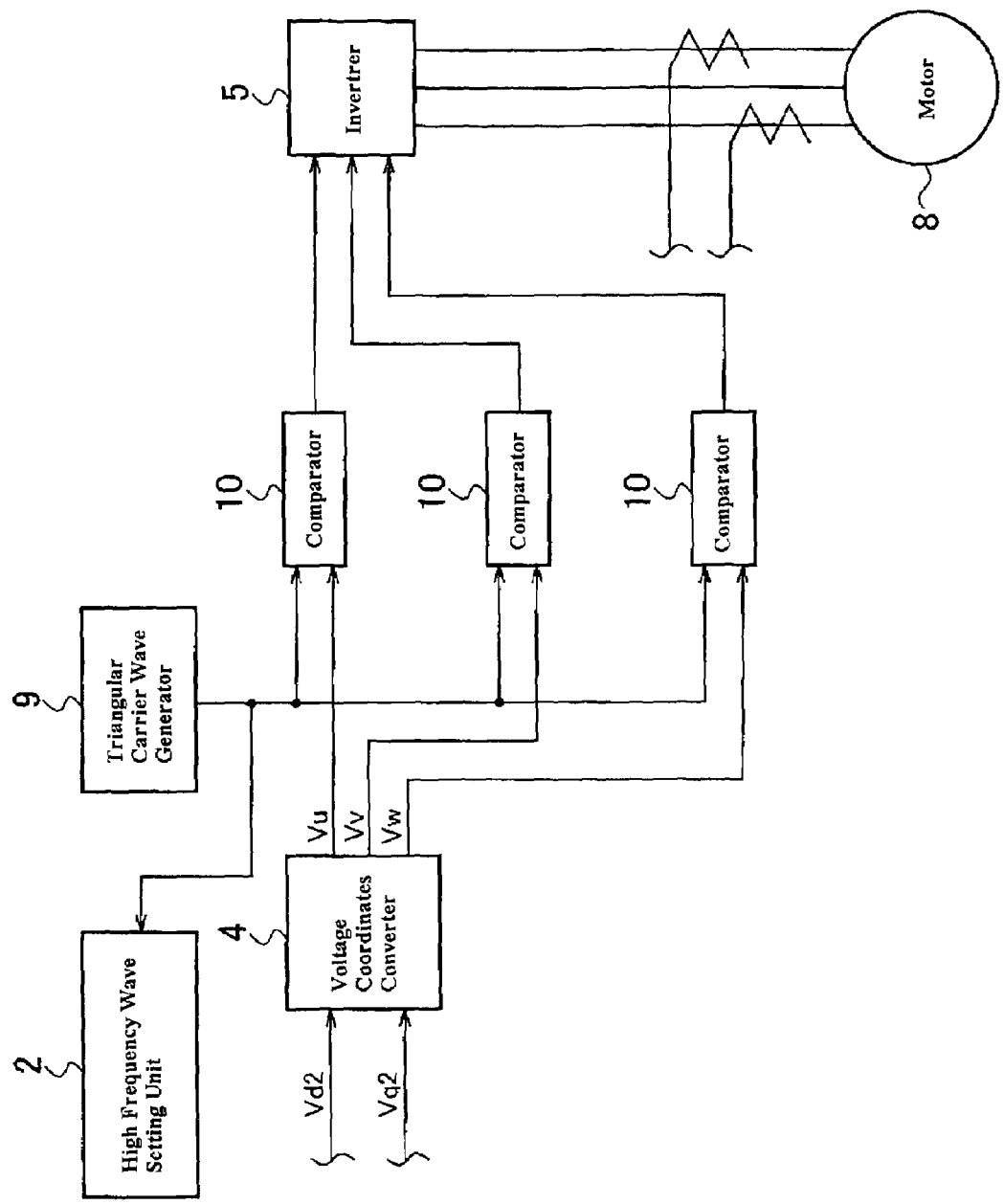
FIG. 8 is a schematic block diagram of a motor control device related to the second embodiment of the present invention.

FIG. 8 is a schematic block diagram of a motor control device related to the second embodiment of the present invention.

In this embodiment, pulse width modulation control, which varies outputs of voltage and frequency of inverter 8 using pulse width modulation (PWM), is applied to the control device of the first embodiment. In other words, much of the configuration of the control device is the same as the first embodiment shown in FIG. 1, and FIG. 8 focuses on the alternative aspects of the configuration in the second embodiment.

As shown in FIG. 8, this embodiment further comprises a triangular carrier wave generator 9, and three comparators 10, for each of u-phase, v-phase and w-phase.

Triangular carrier wave generator 9 generates a pulse width modulation wave, which is triangular carrier wave. The triangular carrier wave is input into three comparators 10 and high frequency wave setting unit 2. In this embodiment, triangular carrier wave generator 9 is configured to vary the frequency of the pulse width modulation wave, i.e., to vary the frequency of the triangular carrier wave generated in triangular carrier wave generator 9.

Each of the comparators 10 compares the triangular carrier wave from triangular carrier wave generator 9 with respective three phase alternating voltage commands Vu, Vv, or Vw, and generates a gate signal to drive inverter 5. High frequency wave setting unit 2 outputs a high frequency wave command 42 synchronously with the frequency of the triangular carrier wave. Thus, the frequency of the superpositioned wave is synchronously varied according to the frequency of the triangular carrier wave.

Figure 9:
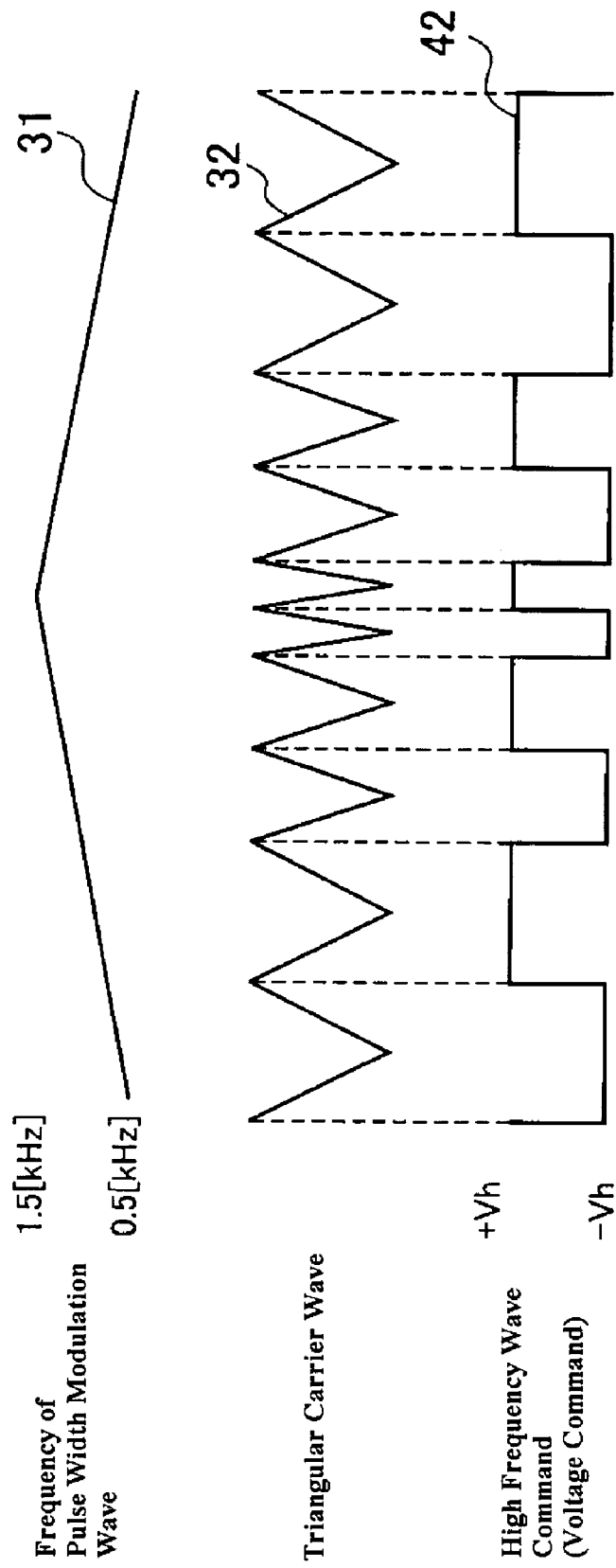
FIG. 9 is a periodic time chart showing the relationships between frequency of a pulse width modulation, a triangular carrier wave, and a high frequency wave command according to the second embodiment.

FIG. 9 is an example of a periodic time chart showing the relationships between a frequency of pulse width modulation, the triangular carrier wave, and the high frequency wave command according to this embodiment.

As shown in FIG. 9, a frequency 31 of the pulse width modulation, which is frequency of the triangular carrier wave 32, is varied continuously between 0.5 kHz and 1.5 kHz over time. In this case, high frequency wave command 42, which is a voltage command, is synchronously varied. More precisely, high frequency wave command 42 changes +Vh to −Vh, or −Vh to +Vh, synchronously with the peaks of the triangular carrier wave 32. Thus, frequency of the superpositioned wave is changes synchronously with the triangular carrier wave. In this manner, because the frequency of the superpositioned wave is varied synchronously with the triangular carrier wave 32, it can reduce noise when pulse width modulation is applied to the motor control device.

The frequency of the triangular carrier wave may be varied periodically or at random. The basis or parameter upon which the frequency of the triangular carrier wave is varied may be time or any other preferable parameters, for example, a noise level of surroundings or a distribution of frequency of the surrounding noise.

When varying the frequency in high frequency wave setting unit 2, a periodic (e.g., repeating) cycle in which the frequency is varied according to method above may preferably be set to be more than ten (10) times as long as a period or cycle of the superpositioned wave. In other words, the variation is repeated every 10 or more periods or cycles of the superpositioned wave.

Just as with the the first embodiment, the superpositioned wave may be overlapped on a current command rather than a voltage command.

Figure 10:
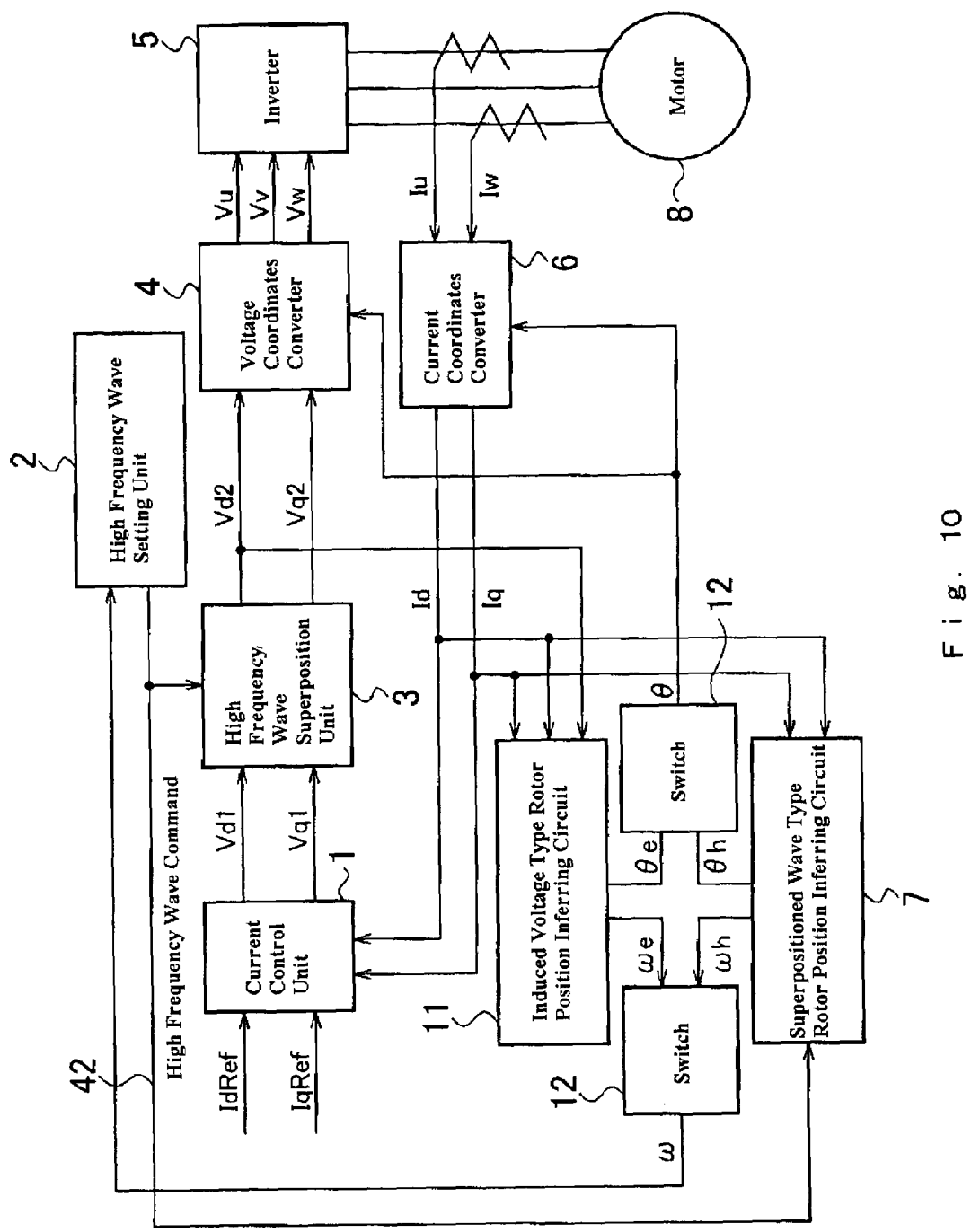
FIG. 10 is a schematic block diagram of a motor control device related to the third embodiment of the present invention.

FIG. 10 is a schematic block diagram of a motor control device related to the third embodiment of the present invention.

As shown in FIG. 10, in addition to the elements of the control device of the first embodiment, the motor control device according to this embodiment includes an induced voltage type rotor position inferring circuit 11 and a switch 12. Overall, this motor control device includes a current control unit 1, a high frequency wave setting unit 2, a high frequency wave superposition unit 3, a voltage coordinates converter 4, an inverter 5, a current coordinates converter 6, a superpositioned wave type position inferring circuit 7, induced voltage type rotor position inferring circuit 11, and a switch 12. The explanation of various elements in FIG. 10 are omitted because they are common to, and described in connection with, the first embodiment of FIG. 1.

As with the first embodiment, high frequency wave setting unit 2 outputs a high frequency wave command 42, which is superpositioned to first voltage commands Vd1 and Vq1 that are provided by current control unit 1, in order to infer a position of magnetic pole of a rotor in motor 8. High frequency wave setting unit 2 dynamically varies at least one characteristic, such as a frequency or amplitude, of the high frequency wave command 42 according to time or the like (as described in the first embodiment).

Further, high frequency wave setting unit 2 uses the inferred speed of the rotor ω to vary a particular characteristic or characteristics of the superpositioned wave, such as frequency or amplitude. That is, the speed of the rotor ω, which is obtained in superpositioned wave type rotor position inferring circuit 7 or induced voltage type rotor position inferring circuit 11, is input into high frequency wave setting unit 2.

Superpositioned wave type rotor position inferring circuit 7 infers a position of the magnetic pole, which is an inferred phase θh, and a speed of the rotor ωh, according to detected dq-axes currents Id and Iq from current coordinates converter 6 and high frequency wave command 42 from high frequency wave setting unit 2. This may be achieved by analyzing a component of frequency of the superpositioned wave included in dq-axis currents Id and Iq.

Induced voltage type rotor position inferring circuit 11 also infers a position of the magnetic pole, which is an inferred phase θe, and a speed of the rotor ωe, according to detected dq-axes currents Id and Iq from current coordinates converter 6 and the second voltage command Vd2 from high frequency wave superposition unit 3. This may be achieved, for example, by extracting a signal that is generated in the rotor by induced voltage when the superpositioned wave is not being applied. The induced voltage type rotor position inferring circuit 11 utilizes the induced voltage of the rotor, which requires that the rotor be rotating.

Inferred phase θh, θe and inferred speed ωh, ωe from both of rotor position inferring circuits 7 and 11 are input into switch 12. Switch 12 outputs one of the inferred phase θh, θe as inferred phase θ and also outputs one of the inferred speed ωh, ωe as inferred speed ω respectively. In other words, switch 12 selects the output signals, which are inferred phase θ and ω, to be either the output signals from superpositioned wave type rotor position inferring circuit 7 or the outputs from induced voltage type rotor position inferring circuit 11, according to a mode of operation. The mode of operation may be decided, for example, by which of the rotor position inferring circuit 7 or 11 is activated at a given time. Superpositioned wave type rotor position inferring circuit 7 is activated when the superpositioned wave is suitably overlapped on first voltage commands Vd1, Vd2. On the other hand, induced voltage type rotor inferring circuit 11 is activated when the rotor is rotating with enough speed, because the rotor can generate induced voltage when it is rotating. Thus, the mode of operation may be decided by the speed of the rotor.

Figure 11:
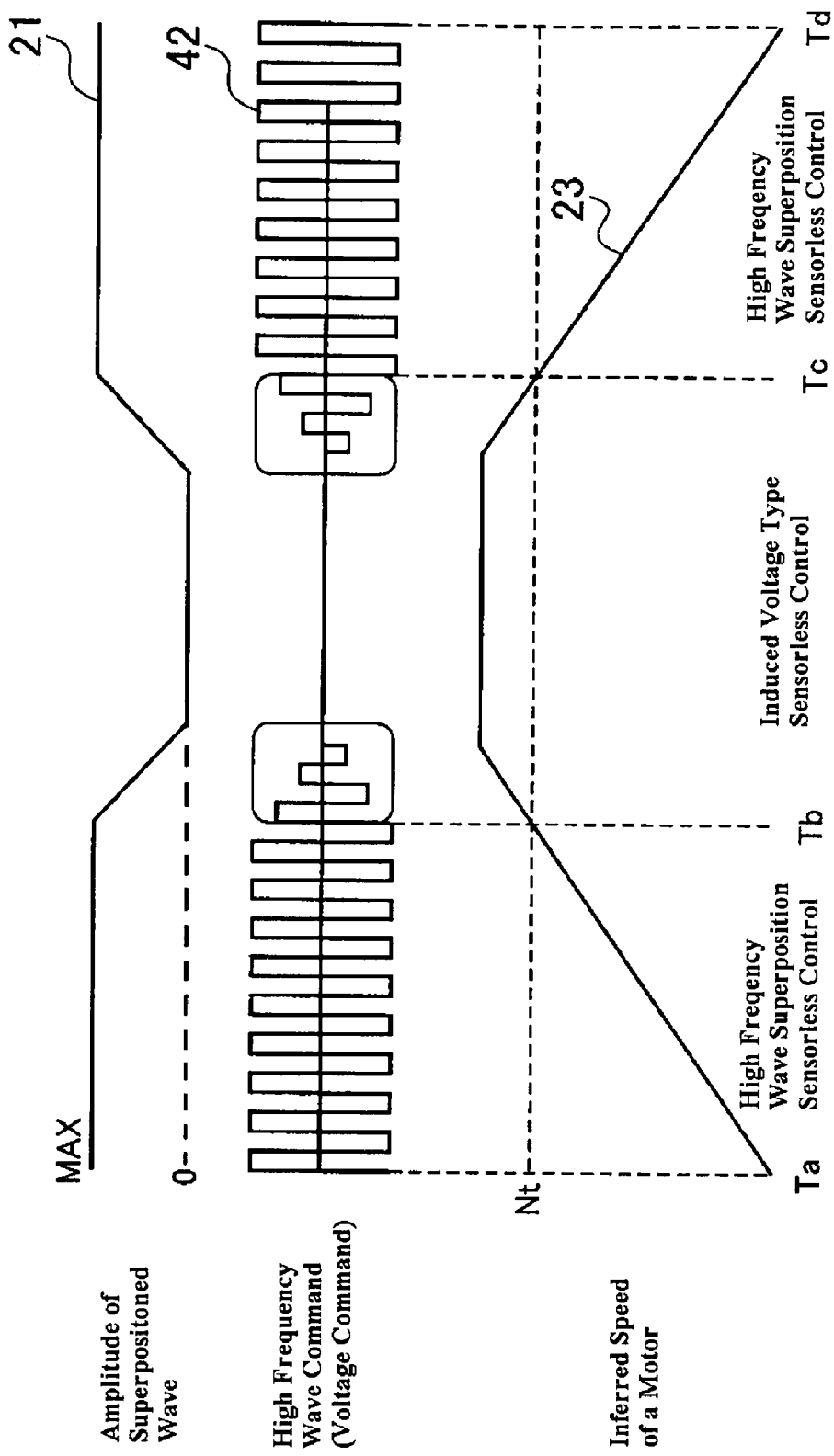
FIG. 11 is a time chart showing relationships between amplitude, a voltage command of a superpositioned wave, and an inferred speed of a motor related to the third embodiment of the present invention

FIG. 11 is a example of a time chart showing a relations between amplitude, a voltage command of a superpositioned wave and an inferred speed of a motor according to this embodiment.

In this example, switch 12 is configured to change over the output signals according to the speed of the rotor. In other words, switch 12 chooses inferred phase θh and inferred speed ωh, which is inputted from superpositioned wave type rotor position inferring circuit 7, as the output signals when the speed of the rotor is less than Nt. The switch chooses inferred phase θe and inferred speed ωe, which is inputted from induced voltage type rotor position inferring circuit 11, as the output signals when the speed of the rotor equals or greater than Nt.

As shown in FIG. 11, the motor starts to rotate at a time Ta and its speed increases. At a time Tb, the speed of the rotor reaches Nt. The motor continues to drive at a speed greater than Nt, and then eventually decreases its speed until it stops at a time Td. At a time Tc, the speed of the rotor drops below Nt.

In this case, when the speed of the rotor is less than Nt, switch 12 chooses inferred phase θh and inferred speed ωh. Thus, from the time Ta to Tb and Tc to Td, the motor is controlled by the high frequency wave superposition sensorless control. On the other hand, between the time Tb and Tc, the motor is controlled by inferring the speed of the rotor according to the induced voltage generated in the rotor (which may be referred to as an "induced voltage type sensorless control").

From the time Th to Tc, it is not required to overlap the superpositioned wave on the first voltage commands Vd1 and Vq1 because the motor is controlled by a induced voltage type sensorless control. That is, there is not need for the superpositioned wave for purposes of inferring the rotor position during this time period.

In this embodiment, when switch 12 changes over the control of the motor from the high frequency wave superposition sensorless control to the induced voltage type sensorless control at time Tb, high frequency wave setting unit 2 sets the amplitude of the superpositioned wave to fade out. On the other hand, when switch 12 is about to change over the control of the motor from the induced voltage type sensorless control to the high frequency wave superposition control at time Tc, high frequency wave setting unit 2 fades in an amplitude of the superpositioned wave. High frequency wave setting unit 2 outputs an increasing amplitude of the superpositioned wave when the speed of rotor is decreasing and becomes close to the speed Nt.

According to this embodiment, since the amplitude of the superpositioned wave is faded in or out as the control of the motor changes between the high frequency wave superposition sensorless control and the induced voltage type sensorless control, it can ease an otherwise unnatural feeling associated with suddenly cut-off the superpositioned wave.

Just as the first embodiment, the characteristics, such as frequency or amplitude, of the superpositioned wave may be varied in the high frequency wave superposition sensorless control in this embodiment. It may also contribute to reduce noise. Further, while the high frequency wave superposition unit 3 overlaps the superpositioned wave on voltage commands Vd1 and Vq1 in this embodiment, it may instead be a current command that is superpositioned by the superpositioned wave.

The motor control device according to this invention may be used for a motor vehicle, which has any preferable electric motor with a rotor.

Other embodiments of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A motor control device used for controlling a motor having a rotor, comprising:
    an inverter that outputs a current for application to a motor;
    a current controller that outputs a voltage, representable as a wave, based on the current output by the inverter;
    a high frequency wave superpositioner that superpositions a high frequency wave on the voltage output from the current controller, the superpositioned high frequency wave used for inferring a position of a rotor in the motor;
    a high frequency wave setter unit that provides the superpositioned high frequency wave to the high frequency wave superpositioner, the high frequency wave setter varies at least one characteristic of the superpositioned high frequency wave;
    a first rotor position inferring circuit that analyzes a component of frequency of the current output from the inverter, and outputs a first inferred rotor position;
    a second rotor position inferring circuit that detects an induced voltage generated in a rotor of the motor, and outputs a second inferred rotor position; and
    a switch that selects the first inferred rotor position or second inferred rotor position.

2. A motor control device according to claim 1, wherein the superpositioned high frequency wave applied to the voltage from the current controller is a current.

3. A motor control device according to claim 1, wherein the superpositioned high frequency wave applied to the voltage from the current controller is a voltage.

4. A motor control device according to claim 1, further comprising:
    a triangular carrier wave generator that generates a triangular carrier wave; and,
    a comparator that compares the triangular carrier wave with a voltage that is based on an output from the high frequency wave superpositioner, and generates a gate signal for the inverter,
    wherein a frequency of the triangular carrier wave is varied, and the high frequency wave setter synchronously varies the frequency of the superpositioned high frequency wave according to the frequency of the triangular carrier wave.

5. A motor control device according to claim 1, wherein the characteristic varied by the high frequency wave setter is a frequency of the superpositioned high frequency wave.

6. A motor control device according to claim 1, wherein the characteristic varied by the high frequency wave setter is amplitude of the superpositioned high frequency wave.

7. A motor control device according to claim 6, wherein the amplitude is varied to be less than a predetermined level, associated with inferring rotor position, for at least a predetermined period of time in a cycle.

8. A motor control device according to claim 1, wherein the high frequency wave setter varies the characteristic of the superpositioned high frequency wave dynamically.

9. A motor control device according to claim 1, wherein the high frequency wave setter varies the characteristic of the superpositioned high frequency wave continuously.

10. A motor control device according to claim 1, wherein the high frequency wave setter varies the characteristic of the superpositioned high frequency wave over a predetermined time period of a periodic cycle.

11. A motor control device according to claim 1, wherein the switch selects the second inferred position if a rotating speed of the motor reaches a predetermined speed level.

12. A motor control device according to claim 11, wherein the selection by the switch is based on rotor speed, and
    wherein an amplitude of the superpositioned high frequency wave is faded out if the rotor speed is within a predetermined range of the predetermined speed level.

13. A motor control device according to claim 1, wherein the current output from the inverter is based on a voltage output from the high frequency wave superpositioner, and the motor control device further comprises a rotor position inferring circuit that analyzes a component of frequency of the current output from the inverter, and outputs an inferred position of the rotor.

14. A motor control device according to claim 13 further comprising:

a voltage coordinates converter that converts the voltage output from the high frequency wave superpositioner into a three-phase alternating voltage, using the inferred rotor position from the rotor position inferring circuit; and, a current coordinates converter that converts the current output from the inverter into a current that is based on a dq-axes coordinates system for a vector control, using the inferred rotor position from the rotor position inferring circuit.

15. A vehicle, comprising
a motor with a rotor;
an inverter that outputs a current for application to the motor;
a current controller that outputs a voltage, representable as a wave, based on the current output by the inverter;
a high frequency wave superpositioner that superpositions a high frequency wave on the voltage output from the current controller, the superpositioned high frequency wave used for inferring a position of a rotor in the motor;
a high frequency wave setter unit that provides the superpositioned high frequency wave to the high frequency wave superpositioner, the high frequency wave setter varies at least one characteristic of the superpositioned high frequency wave;
a first rotor position inferring circuit that analyzes a component of frequency of the current output from the inverter, and outputs a first inferred rotor position;
a second rotor position inferring circuit that detects an induced voltage generated in a rotor of the motor, and outputs a second inferred rotor position; and a switch that selects the first inferred rotor position or second inferred rotor position.

16. A motor control device used for controlling a motor having a rotor, comprising:
an inverter that outputs a current for application to a motor;
a current controller that outputs a current, representable as a wave, based on the current output by the inverter;
a high frequency wave superpositioner that superpositions a high frequency wave on the current output from the current controller, the superpositioned high frequency wave used for inferring a position of a rotor in the motor;
a high frequency wave setter unit that provides the superpositioned high frequency wave to the high frequency wave superpositioner, the high frequency wave setter varies at least one characteristic of the superpositioned high frequency wave;
a first rotor position inferring circuit that analyzes a component of freciuency of the current output from the inverter, and outputs a first inferred rotor position;
a second rotor position inferring circuit that detects an induced voltage generated in a rotor of the motor, and outputs a second inferred rotor position; and
a switch that selects the first inferred rotor position or second inferred rotor position.

17. A motor control device according to claim 16, wherein the superpositioned high frequency wave applied to the current from the current controller is a current.

18. A motor control device according to claim 16, wherein the superpositioned high frequency wave applied to the current from the current controller is a voltage.

19. A motor control device according to claim 16, further comprising:

a triangular carrier wave generator that generates a triangular carrier wave; and,
a comparator that compares the triangular carrier wave with a current that is based on an output from the high frequency wave superpositioner, and generates a gate signal for the inverter,
wherein a frequency of the triangular carrier wave is varied, and the high frequency wave setter synchronously varies the frequency of the superpositioned high frequency wave according to the frequency of the triangular carrier wave.

20. A motor control device according to claim 16, wherein the characteristic varied by the high frequency wave setter is a frequency of the superpositioned high frequency wave.

21. A motor control device according to claim 16, wherein the characteristic varied by the high frequency wave setter is amplitude of the superpositioned high frequency wave.

22. A motor control device according to claim 21, wherein the amplitude is varied to be less than a predetermined level, associated with inferring rotor position, for at least a predetermined period of time in a cycle.

23. A motor control device according to claim 16, wherein the high frequency wave setter varies the characteristic of the superpositioned high frequency wave dynamically.

24. A motor control device according to claim 16, wherein the high frequency wave setter varies the characteristic of the superpositioned high frequency wave continuously.

25. A motor control device according to claim 16, wherein the high frequency wave setter varies the characteristic of the superpositioned high frequency wave over a predetermined time period of a periodic cycle.

26. A motor control device according to claim 16 wherein the switch selects the second inferred position if a rotating speed of the motor reaches a predetermined speed level.

27. A motor control device according to claim 26, wherein the selection by the switch is based on rotor speed, and
wherein an amplitude of the superpositioned high frequency wave is faded out if the rotor speed is within a predetermined range of the predetermined speed level.

28. A motor control device according to claim 16, wherein the current output from the inverter is based on a voltage output from the high frequency wave superpositioner, and the motor control device further comprises a rotor position inferring circuit that analyzes a component of frequency of the current output from the inverter, and outputs an inferred position of the rotor.

29. A motor control device according to claim 28, further comprising:
a first current coordinates converter that converts the current output from the high frequency wave superpositioner into a three-phase alternating current, using the inferred rotor position from the rotor position inferring circuit; and,
a second current coordinates converter that converts the current output from the inverter into a current that is based on a dq-axes coordinates system for a vector control, using the inferred rotor position from the rotor position inferring circuit.

30. A vehicle, comprising
a motor with a rotor;
an inverter that outputs a current for application to the motor;

a current controller that outputs a current, representable as a wave, based on the current output by the inverter;

a high frequency wave superpositioner that superrositions a high frequency wave on the current output from the current controller, the superpositioned high frequency wave used for inferring a position of a rotor in the motor;

a high frequency wave setter unit that provides the superpositioned high frequency wave to the high frequency wave superpositioner, the high frequency wave setter varies at least one characteristic of the superpositioned high frequency wave;

a first rotor position inferring circuit that analyzes a component of frequency of the current output from the inverter, and outputs a first inferred rotor position;

a second rotor position inferring circuit that detects an induced voltage generated in a rotor of the motor, and outputs a second inferred rotor position; and a switch that selects the first inferred rotor position or second inferred rotor position.

31. A method of controlling a motor, comprising:

supplying a current to the motor;

determining a control value based on the supplied current;

inferring a position of the rotor of the motor; and determining an updated current to be supplied to the motor based on the inferred rotor position, wherein inferring the position of the motor is achieved by:
  (i) superpositioning a high frequency wave on the control value and analyzing a component of frequency of the current supplied to the motor when a speed of the rotor is less than a predetermined speed,
  (ii) analyzing induced voltage generated at the rotor of the motor when a speed of the rotor is greater than the predetermined speed;

wherein the high frequency wave varies in at least one of its characteristics.

* * * * *